(12) United States Patent
Fried et al.

(10) Patent No.: US 8,140,856 B2
(45) Date of Patent: Mar. 20, 2012

(54) METHOD AND APPARATUS FOR REMOVING ENCRYPTED FILES UNASSOCIATED WITH A USER KEY FROM AN ARCHIVE

(75) Inventors: Eric P. Fried, Austin, TX (US); Rajeev Mishra, Bangalore (IN); Konagalli N. Rajesh, Bangalore (IN); Suresh Sabarathinam, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 975 days.

(21) Appl. No.: 11/935,743

(22) Filed: Nov. 6, 2007

(65) Prior Publication Data

US 2009/0119341 A1 May 7, 2009

(51) Int. Cl.
G06F 21/00 (2006.01)

(52) U.S. Cl. .................................................. 713/186

(58) Field of Classification Search .................. 713/165, 713/186; 707/200, E17.005
See application file for complete search history.

(56) References Cited

U.S. PATENT DOCUMENTS

| 5,987,510 A | 11/1999 | Imai et al. |
| 6,148,334 A | 11/2000 | Imai et al. |
| 6,510,467 B1 | 1/2003 | Behfar et al. |
| 2006/0173848 A1* | 8/2006 | Peterson et al. ............... 707/9 |
| 2007/0073728 A1* | 3/2007 | Klein et al. ................... 707/10 |
| 2007/0239948 A1* | 10/2007 | Muraki et al. ............... 711/162 |
| 2008/0071688 A1* | 3/2008 | Corbett et al. ................ 705/59 |

* cited by examiner

Primary Examiner — Ellen Tran
(74) Attorney, Agent, or Firm — Robert C. Rolnik; David A. Mims

(57) ABSTRACT

The present invention provides a computer implemented method, data processing system, and computer program product to selectively extracts compressed-encrypted files from an archive. The data processing system receives a command to preprocess the archive from an authenticated user, wherein the authenticated user is associated with at least one fingerprint. The data processing system determines that the at least one fingerprint fails to match all fingerprints in metadata of a first compressed-encrypted file in the archive. The data processing system, responsive to a determination that the fingerprint fails to match all fingerprints, deletes the compressed-encrypted file. The data processing system determines that the fingerprint matches a second fingerprint in metadata of a second compressed-encrypted file in the archive. The data processing system, responsive to a determination that the fingerprint matches the second fingerprint, avoids deleting the second compressed-encrypted file.

20 Claims, 4 Drawing Sheets

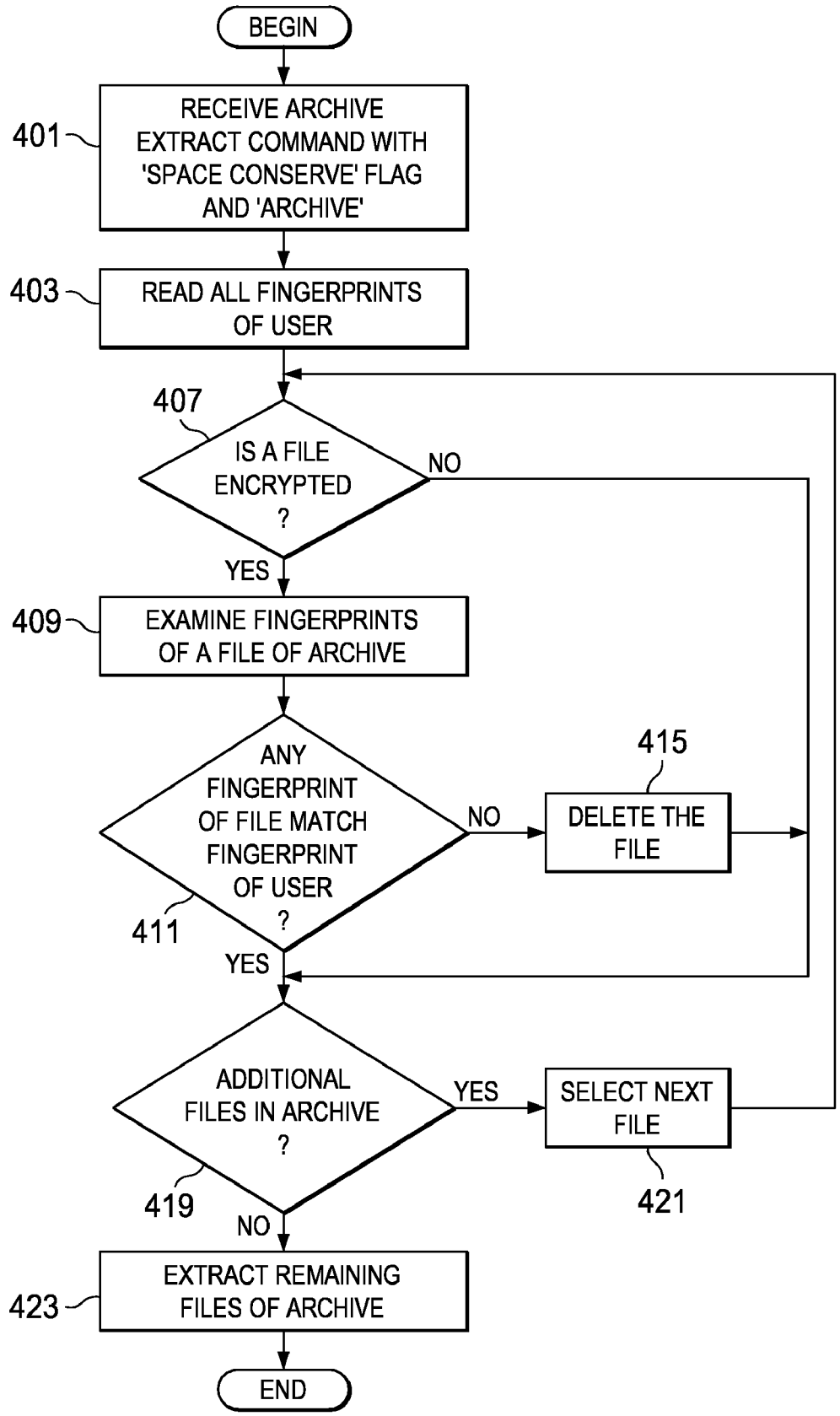

METHOD AND APPARATUS FOR REMOVING ENCRYPTED FILES UNASSOCIATED WITH A USER KEY FROM AN ARCHIVE

BACKGROUND OF THE INVENTION

1. Field of the Invention

The present invention relates generally to a computer implemented method, data processing system, and computer program product for conserving free disk space in data processing systems having a file encrypted with a first key and a file encrypted with a second key. More specifically, the present invention relates to selectively deleting encrypted files based on a key associated with a user session and at least one key associated with the encrypted files.

2. Description of the Related Art

Distribution of executable files and data can performed in a manner that reduces the transport and storage costs of the set of files. The set, sometimes called a distribution, package or a release, can occupy considerably less space if compressed. A manufacturer of such a package may provide features and data that are available on a tiered basis. For example, a version of the distribution may provide functions for an entry-level purchaser of the distribution. Another version of the distribution may provide functions for an advanced purchaser of the distribution. The component files of each package may be encrypted with a public key of one or more users, so that a subset of functionality in the package is available to be decrypted by each user.

Each version of the distribution may be available in an archive, for example a tape archive (TAR). Unfortunately, the archive may have many files that a particular user cannot extract since files are encrypted with keys not associated with the user. This feature of TARs can make embedded files useless with respect to the user. Consequently, the useless files can occupy space on a file system with no attendant benefit.

It would be helpful to eliminate useless files from an archive prior to de-compressing or extracting the files of the archive.

SUMMARY OF THE INVENTION

The present invention provides a computer implemented method, data processing system, and computer program product to selectively extract compressed-encrypted files from an archive. The data processing system receives a command to preprocess the archive from an authenticated user, wherein the authenticated user is associated with at least one fingerprint. The data processing system determines that at least one fingerprint fails to match all fingerprints in metadata of a first compressed-encrypted file in the archive. The data processing system, responsive to a determination that the fingerprint fails to match all fingerprints, deletes the compressed-encrypted file. The data processing system determines that the fingerprint matches a second fingerprint in metadata of a second compressed-encrypted file in the archive. The data processing system, responsive to a determination that the fingerprint matches the second fingerprint, avoids deleting the second compressed-encrypted file.

BRIEF DESCRIPTION OF THE DRAWINGS

The novel features believed characteristic of the invention are set forth in the appended claims. The invention itself however, as well as a preferred mode of use, further objectives and advantages thereof, will best be understood by reference to the following detailed description of an illustrative embodiment when read in conjunction with the accompanying drawings, wherein:

FIG. 4 is an alternative flowchart of steps to remove files from an archive in accordance with an illustrative embodiment of the invention.

DETAILED DESCRIPTION OF THE PREFERRED EMBODIMENT

Figure 1:
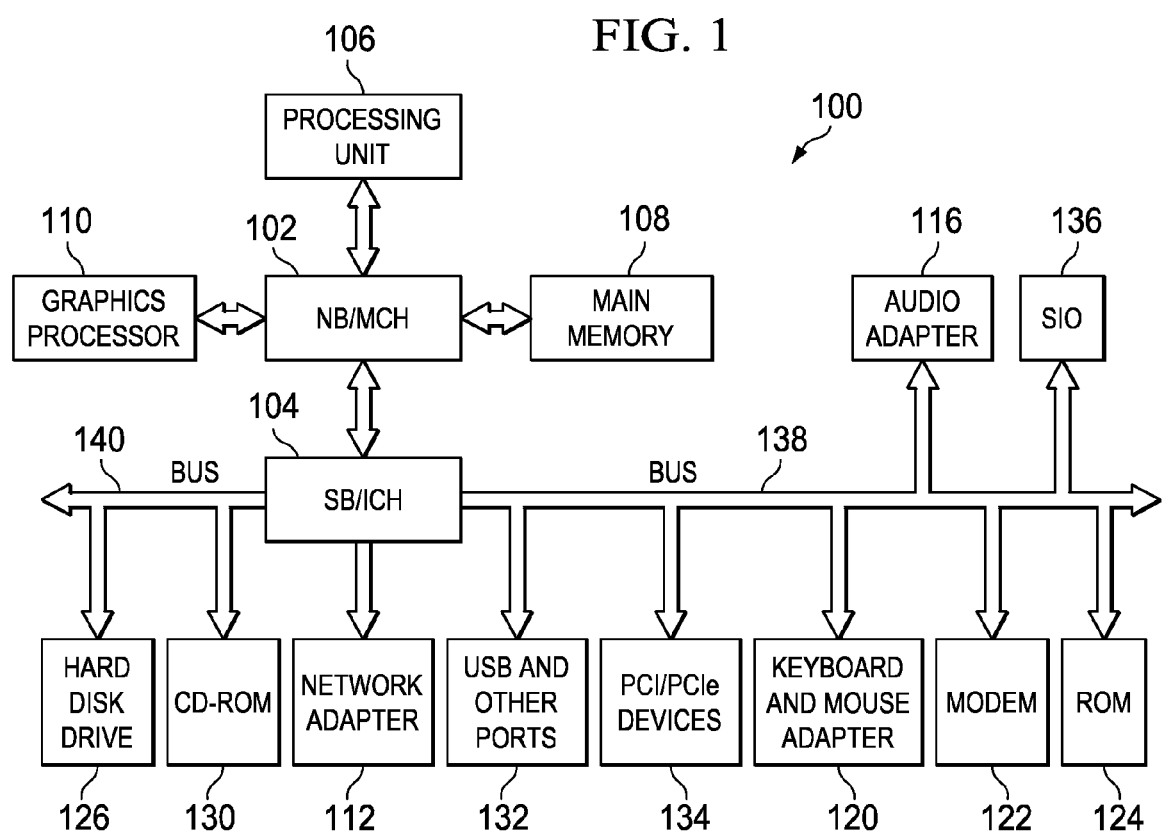
FIG. 1 is a block diagram of a data processing system in which aspects of an illustrative embodiment may be implemented.

With reference now to the figures and in particular with reference to FIG. 1, a block diagram of a data processing system is shown in which aspects of an illustrative embodiment may be implemented. Data processing system 100 is an example of a computer, in which code or instructions implementing the processes of the present invention may be located. In the depicted example, data processing system 100 employs a hub architecture including a north bridge and memory controller hub (NB/MCH) 102 and a south bridge and input/output (I/O) controller hub (SB/ICH) 104. Processor 106, main memory 108, and graphics processor 110 connect to north bridge and memory controller hub 102. Graphics processor 110 may connect to the NB/MCH through an accelerated graphics port (AGP), for example.

In the depicted example, local area network (LAN) adapter 112 connects to south bridge and I/O controller hub 104 and audio adapter 116, keyboard and mouse adapter 120, modem 122, read only memory (ROM) 124, hard disk drive (HDD) 126, CD-ROM drive 130, universal serial bus (USB) ports and other communications ports 132, and PCI/PCIe devices 134 connect to south bridge and I/O controller hub 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS). Hard disk drive 126 and CD-ROM drive 130 may use, for example, an integrated drive electronics (IDE) or serial advanced technology attachment (SATA) interface. A super I/O (SIO) device 136 may be connected to south bridge and I/O controller hub 104.

An operating system runs on processor 106 and coordinates and provides control of various components within data processing system 100 in FIG. 1. The operating system may be a commercially available operating system such as Microsoft® Windows® XP. Microsoft and Windows are trademarks of Microsoft Corporation in the United States, other countries, or both. An object oriented programming system, such as the Java™ programming system, may run in conjunction with the operating system and provides calls to the operating system from Java™ programs or applications executing on data processing system 100. Java™ is a trademark of Sun Microsystems, Inc. in the United States, other countries, or both.

Instructions for the operating system, the object-oriented programming system, and applications or programs are located on storage devices, such as hard disk drive 126, and may be loaded into main memory 108 for execution by processor 106. The processes of the present invention can be performed by processor 106 using computer implemented instructions, which may be located in a memory such as, for example, main memory 108, read only memory 124, or in one or more peripheral devices.

Those of ordinary skill in the art will appreciate that the hardware in FIG. 1 may vary depending on the implementation. Other internal hardware or peripheral devices, such as flash memory, equivalent non-volatile memory, and the like, may be used in addition to or in place of the hardware depicted in FIG. 1. In addition, the processes of the illustrative embodiments may be applied to a multiprocessor data processing system.

In some illustrative examples, data processing system 100 may be a personal digital assistant (PDA), which is configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communication unit may include one or more devices used to transmit and receive data, such as a modem or a network adapter. A memory may be, for example, main memory 108 or a cache such as found in north bridge and memory controller hub 102. A processing unit may include one or more processors or CPUs. The depicted example in FIG. 1 is not meant to imply architectural limitations. For example, data processing system 100 also may be a tablet computer, laptop computer, or telephone device in addition to taking the form of a PDA.

The aspects of the illustrative embodiments provide a computer implemented method, data processing system, and computer program product for reducing storage space occupied by files in an archive. Space can be freed from use by files that a user has no authority to decrypt. Consequently, additional functionality can be derived from a data processing system with limited storage space.

Figure 2A:
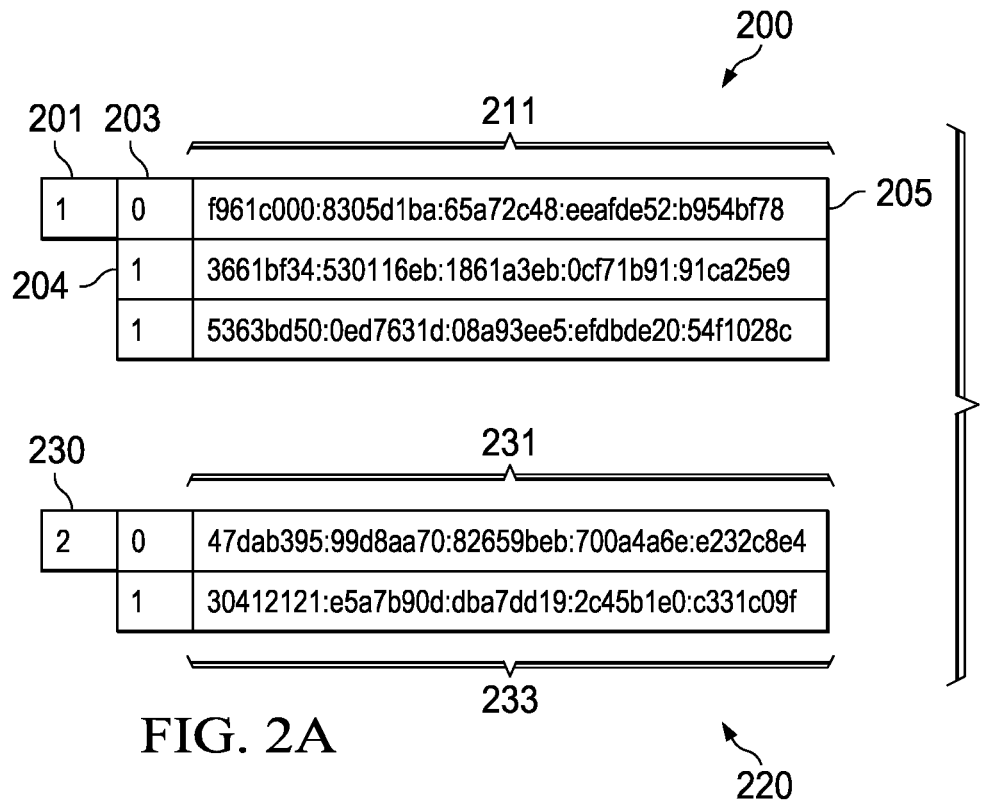
FIG. 2A shows a data structure for storing user credentials in an encrypted file system in accordance with an illustrative embodiment of the invention.

FIG. 2A shows a data structure for storing user credentials in an encrypted file system in accordance with an illustrative embodiment of the invention. User1 200 is identified by a user identifier. In this case, the user identifier is 1 and is stored in user identifier field 201. User1 has an associated keystore. Keystore 200 includes valid encryption fingerprint 211, and several deprecated fingerprints associated with user1. Keystore 200 may be organized, for example, as described in the Personal Information Exchange Syntax Standard (PKCS). A fingerprint is an identifier to a key pair. A key pair is comprised of a private key and a public key. The fingerprint is a signature for the key pair. A fingerprint may be created by applying a cryptographic hash function to a public key. Fingerprint 205 is an example of a fingerprint. A cryptographic hash function is an algorithm that converts a large block of data of a certain type, and reduces the data to a more compact block of data such that, for a set of distinct blocks of input data, there is a high likelihood that each compact block remains unique. In other words, there is seldom a compact block that may result from two different input blocks. Here, the compact block is the fingerprint, and the public key is the input block. Since a fingerprint is shorter than the associated public key, the fingerprint can be used to simplify certain key management tasks. Thus, each fingerprint of user1 200 is associated with a unique private key and a unique public key (not shown).

An active fingerprint is a fingerprint that has a "0" in the validity bit field, for example, validity bit field for first fingerprint 203. A deprecated fingerprint is a fingerprint that has a "1" in a validity bit field, for example, validity bit field 204. User2 230 includes in its associated keystore 220 two fingerprints, active fingerprint 231, and deprecated fingerprint 233. A user may set a validity bit field to "1" when the user believes that the private key associated with the fingerprint has been compromised and no longer can be relied upon as being uniquely known or available to the user.

An encrypted file system stores files with associated metadata. Encrypted files may be encrypted with one or more public keys. When a file is encrypted with more than one public-key, there can be at least two users that can decrypt the file. A data processor supporting an encrypted file system can store and read metadata that indicates which users may decrypt a file of the Encrypted File System (EFS).

Figure 2B:
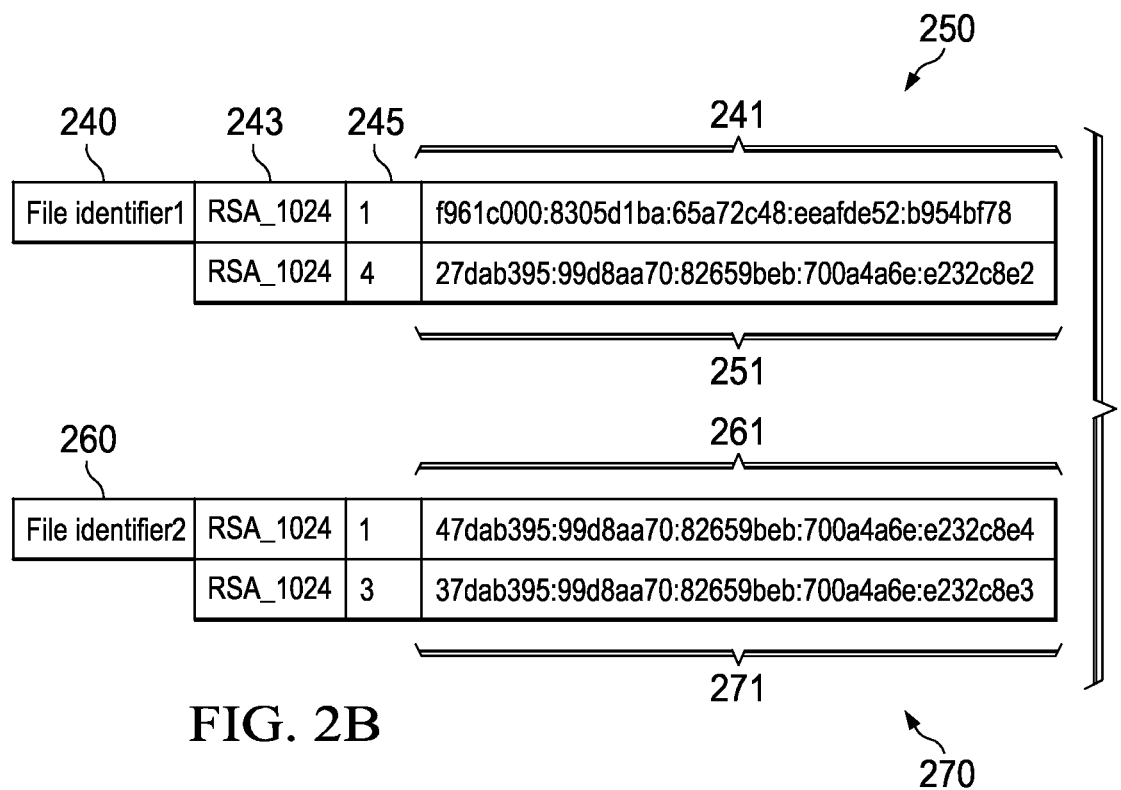
FIG. 2B shows metadata associated with two files in accordance with an illustrative embodiment of the invention.

FIG. 2B shows metadata associated with two files in accordance with an illustrative embodiment of the invention. A first file's metadata, for example, first file metadata 250, can include file identifier 240, first EFS fingerprint 241 and second EFS fingerprint 251. A key store can include, for example, key store algorithm designation 243, user identifier 245, and key fingerprint 241. A second file's metadata, for example, second file metadata 270, includes file identifier2 260, first fingerprint 261 and second fingerprint 271. A file in an encrypting file system may be associated with a key store, and therefore encrypted by the public-key associated with the key store. For example, one of the fingerprints associated with a first file is fingerprint 241. This association with the fingerprint indicates that the file associated with file identifier1 has been encrypted using a public-key associated with fingerprint 241.

The presence of a matching fingerprint association with a file as compared to a fingerprint of a user indicates that the user is capable of decrypting the file. For example, fingerprint 241 matches the fingerprint associated with user1 201 or fingerprint 205. Consequently, user1 can decrypt the file associated with file identifier1 240. However, user2, having user identifier2, 230 cannot decrypt the file associated with file identifier1 240. User2 cannot decrypt because neither key store 231 nor key store 233 match either of the fingerprint 241 or fingerprint 251. However, user2 can decrypt the file associated with file identifier2 because fingerprint 231 associated with user2 matches fingerprint 261 associated with the file of file identifiers.

An authenticated user is a session established with a data processing system where the data processing system receives credentials that match a set of credentials stored by the data processing system. Typically, the data processing system receives credentials by a keyboard entry that responds to login and password prompting. Once authenticated by an operating system, a user interacts with the computer for a period known as a session. The session ends when the user logs out, or when the computer forces the sessions to end. On Unix, Linux® and other similar systems, users are represented by a user identifier (UID). Linux® is a trademark of Linus Torvalds in the United States and several other countries. Consequently, each session can have an associated UID, and each command or function entered in the session has an associated UID. The commands and functions indirectly invoked by user input are associated with the UID, even though it is possible for additional users to share a keyboard with the user who provided the login credentials. Thus, a command input to the data processing system is from the authenticated user, despite any later transfer of control by the person logging into the system to a second person during the session.

A command is a user triggered function of a data processing system. Commands may reach the data processing system such as data processing system 100 of FIG. 1 by many ways. For example, a command can be interpreted by inputs at the keyboard and mouse adapter 120. A command can be interpreted by inputs arriving from a remote terminal attached via, for example, network adapter 112 of FIG. 1. The command can be a string that identifies executable code in a file of the data processing system. The command may be entered with one or more flags or parameters that indicate what features of the command to operate and any data with which the command is to interact. For example, a command may be "tar –xvf myarchive.tar". "Tar" can be the name of the executable file. "-xvf" can be the set of flags, for example, 'x' may signal that the command is to extract files. "myarchive.tar" can be the name of a target archive that the command is to operate upon.

Figure 3:
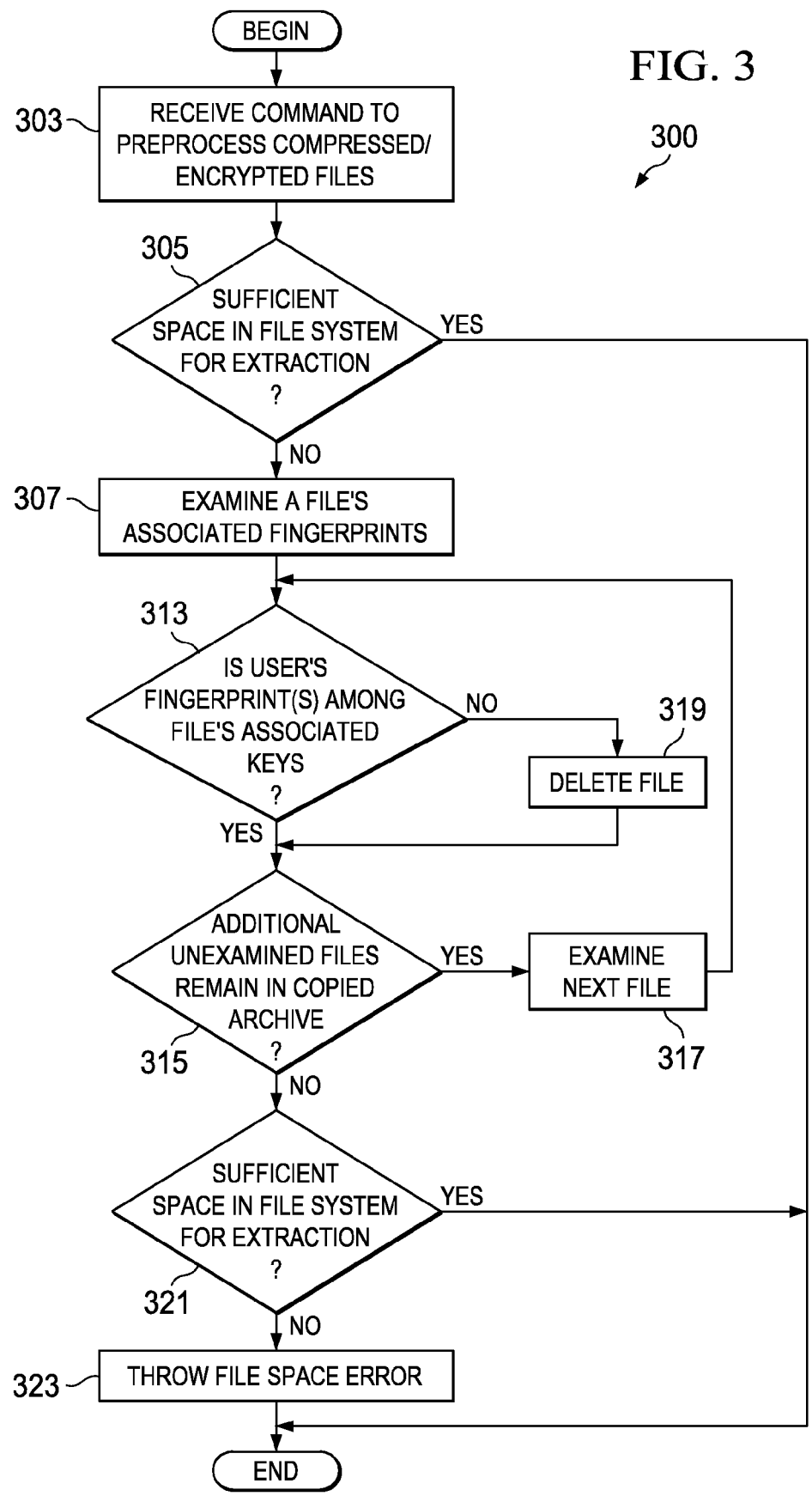
FIG. 3 is a flowchart of steps to remove files from an archive in accordance with an illustrative embodiment of the invention.

FIG. 3 is a flowchart of steps to remove files from an archive in accordance with an illustrative embodiment of the invention. The steps of flowchart 300 are performed in a session. Consequently, references to a user fingerprint are to the fingerprint associated with the user associated with the credentials provided at the beginning of the session. Initially an authenticated user enters a command on a data processing system. The data processing system receives the command to process or preprocess a group of compressed-encrypted files in an archive (step 303). An archive is a set of files concatenated into a single file. A compressed-encrypted file is a file that is compressed and encrypted. The group of compressed-encrypted files may be, for example, stored to a tape archive formatted file, portable archive exchange file, CPIO, or the like. Each compressed-encrypted file has associated metadata, for example, as shown in metadata 250 or metadata 270 of FIG. 2B. The metadata is also stored into the archive along with the encrypted file content.

Next, the data processing system determines whether there is sufficient space in the file system hosting/storing the archive for extraction (step 305). A negative determination means that the data processing system determined that the space is insufficient for extracting all files in the archive. Thus, a negative branch from step 305 causes the data processing system to examine a file's associated fingerprints (step 307). The data processing system may, for example, read the extended attribute of the file to obtain the metadata. If sufficient space exists, the process terminates.

Next, the data processing system may determine whether a user fingerprint matches any key associated with the file (step 313). A negative result means that the data processing system determined that the user fingerprint failed to match any fingerprint in the metadata. Consequently, in response to a negative determination at step 313, the data processing system deletes the compressed encrypted file (step 319). Responsive to a determination of a match between the user fingerprint and the fingerprint of the file, the data processing system may not delete the file.

The data processing system continues immediately following step 319 or after negative outcome to step 313 by determining whether additional unexamined files remain in the archive (step 315). If so, the data processing system examines a next file (step 317). Next, processing continues at step 313.

After determining that additional unexamined files do not remain, the data processing system determines whether sufficient space exists in the file system for extraction (step 321). A file system is usable storage within a non-volatile storage, for example, hard disk drive 126 of FIG. 1. Space is usable but unallocated physical storage in the file system. Space may be defined as whole multiples of blocks. A block may be the smallest unit of space that a data processing system may allocate. A determination of whether sufficient space exists may include, for example, calculating a file size that a compressed file would use if extracted. Next, the data processing system may calculate a number of blocks needed for the uncompressed file size. In addition, the data processing system may accumulate the blocks needed by an uncompressed file with other calculated uncompressed file sizes of the archive, thus summing the overall blocks needed for uncompressing the archive. Finally, the data processing system may compare the overall blocks needed for uncompressing the archive with the usable and unallocated blocks of the file system. As can be appreciated, other methods of determining the sufficiency of space in the file system can be used. For example, the data processing system may accumulate space reserved for a swap file into the overall blocks needed for uncompressing the archive.

A negative result to step 321 causes the data processing system to throw a file space error (step 323). For example, the data processing system my display text to a terminal of the data processing system stating, "Space insufficient in file system for extracting. Archival Preprocessing also tried. Try removing some non-essential files." Processing terminates thereafter.

FIG. 4 is an alternative flowchart of steps to remove files from an archive in accordance with an illustrative embodiment of the invention. Initially, the data processing system receives an archive extract command that includes a designation to conserve space and identifies the target archive (step 401). Next, the data processing system may read all fingerprints of the user (step 403). Fingerprints can include the deprecated fingerprints of the user that has opened a session to the data processing system. Next, the data processing system determines if a file of the archive is encrypted (step 407). The data processing system may read a file attribute or other metadata to determine whether the file is encrypted. If the file is not encrypted, the data processing system may skip deleting the file and continue with step 419.

If the file is encrypted, the data processing system examines the fingerprints of the file (step 409). Next, the data processing system determines if any fingerprint of the file matches any fingerprint of the user (step 411). If no fingerprints match, then the data processing system deletes the file (step 415). Otherwise, the data processing system does not delete the file. Files that have been determined to match a fingerprint of the user in step 411 are remaining files.

Next, the data processing system determines if additional files exist in the archive (step 419). If additional files exist, the data processing system selects a next file (step 421). Next, the data processing system repeats step 407, but using the file selected in step 421.

However, if no additional files are in the archive, the data processing system may exit the negative branch of step 419. Next, the data processing system extracts the remaining files of the archive (step 423). Processing terminates thereafter. When the data processing system extracts a compressed-encrypted file, the data processing system stores an uncompressed and decrypted file. The data processing system derives the uncompressed file from the compressed-encrypted file by applying a decompression algorithm to the file in order to produce an uncompressed file of a larger size than the compressed-encrypted file. The compression algorithm and associated decompression algorithms may be according to the Advanced Encryption Standard (AES). Extracting may be performed by using decompression functions, for example, for an archive named "archive.tar", using the Linux command, "tar –x archive.tar". For example, a preprocessing command may instruct a data processing system to perform all steps from 401 through 421. The preprocessing command may pipe or otherwise provide remaining files to the "tar" command for extracting.

Thus, aspects of the illustrative embodiments may economically extend the lifetime of a hard disk drive or other storage by removing files not useful to a particular user as a step to extracting an archive. In particular, aspects of the illustrative embodiments permit a second level inquiry into the sufficiency of disk space to carry out an extraction operation. Archival preprocessing may permit the data processing to proceed in spite of lacking sufficient space for a complete extraction of an archive. Consequently, a user may avoid spending time adding storage hardware. In addition, a user may avoid having to review file content, names or dates in order to decide whether to remove the files to accomplish an extraction of an archive.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for selectively extracting compressed-encrypted files from an archive, the computer implemented method comprising:
    receiving a command to preprocess the archive from an authenticated user, wherein the authenticated user is associated with at least one public key fingerprint;
    determining that the at least one public key fingerprint fails to match all public key fingerprints in metadata of a first compressed-encrypted file in the archive;
    responsive to a determination that the public key fingerprint fails to match all public key fingerprints, deleting the compressed-encrypted file;
    determining that the public key fingerprint matches a second public key fingerprint in metadata of a second compressed-encrypted file in the archive; and
    responsive to a determination that the public key fingerprint matches the second public key fingerprint, not deleting the second compressed-encrypted file.

2. The computer implemented method of claim 1, further comprising:
    determining that insufficient space exists in a file system hosting the archive, wherein the space is insufficient for extracting all files in the archive; and wherein receiving the command to preprocess the archive from the authenticated user is responsive to a determination that insufficient space exists in the file system.

3. The computer implemented method of claim 2, further comprising:
    responsive to the determination that the at least one public key fingerprint matches the second public key fingerprint, extracting the second compressed-encrypted file to form an uncompressed file.

4. The computer implemented method of claim 3, further comprising:
    responsive to not deleting the second compressed-encrypted file, determining that sufficient space exists to extract the second compressed-encrypted file; and
    responsive to a determination that sufficient space exists to extract the second compressed-encrypted file, extracting the second compressed-encrypted file.

5. The computer implemented method of claim 1, further comprising:
    determining that a third file in the archive is not encrypted; and
    responsive to a determination that the third file in the archive is not encrypted, not deleting the third file.

6. The computer implemented method of claim 1, wherein the at least one public key fingerprint comprises an active public key fingerprint and a deprecated public key fingerprint.

7. The computer implemented method of claim 4, wherein the metadata is in an extended attribute.

8. A data processing system comprising:
    a bus;
    a storage device connected to the bus, wherein computer usable code is located in the storage device;
    a communication unit connected to the bus;
    a processing unit connected to the bus, wherein the processing unit executes the computer usable code for selectively extracting compressed-encrypted files from an archive, the processing unit further executes the computer usable code to receive a command to preprocess the archive from an authenticated user, wherein the authenticated user is associated with at least one public key fingerprint; first determine that the at least one public key fingerprint fails to match all public key fingerprints in metadata of a first compressed-encrypted file in the archive; responsive to a determination that the public key fingerprint fails to match all public key fingerprints, delete the compressed-encrypted file; second determine that the public key fingerprint matches a second public key fingerprint in metadata of a second compressed-encrypted file in the archive; and responsive to a determination that the public key fingerprint matches the second key fingerprint, not delete the second compressed-encrypted file.

9. The data processing system of claim 8, wherein the processing unit further executes the computer usable code to determine that insufficient space exists in a file system hosting the archive, wherein the space is insufficient for extracting all files in the archive; and responsive to a determination that insufficient space exists in the file system, first determine that the at least one fingerprint fails to match all fingerprints in metadata of a first compressed-encrypted file in the archive.

10. The data processing system of claim 9, wherein the processing unit further, responsive to the determination that the at least one public key fingerprint matches the second public key fingerprint, executes the computer usable code to extract the second compressed-encrypted file to form an uncompressed file.

11. The data processing system of claim 10, wherein the processing unit further executes the computer usable code to, responsive to not deleting the second compressed-encrypted file, determine that sufficient space exists to extract the second compressed-encrypted file; and, responsive to a determination that sufficient space exists to extract the second compressed-encrypted file, extract the second compressed-encrypted file.

12. The data processing system of claim 8, wherein the processing unit further executes the computer usable code to determine that a third file in the archive is not encrypted; and responsive to a determination that the third file in the archive is not encrypted, avoid deleting of the third file.

13. The data processing system of claim 8, wherein the at least one public key fingerprint comprises an active public key fingerprint and a deprecated public key fingerprint.

14. The data processing system of claim 11, wherein the metadata is in an extended attribute.

15. A computer program product for selectively extracting compressed-encrypted files from an archive, the computer program product comprising:

one or more computer-readable, storage devices and computer-readable program instructions which are stored on the one or more storage devices and when executed by one or more processors;

program instructions, stored on at least one of the one or more storage devices to receive a command to preprocess the archive from an authenticated user, wherein the authenticated user is associated with at least one public key fingerprint;

program instructions, stored on at least one of the one or more storage devices to determine that the at least one public key fingerprint fails to match all public key fingerprints in metadata of a first compressed-encrypted file in the archive;

program instructions, stored on at least one of the one or more storage devices to, responsive to a determination that the public key fingerprint fails to match all public key fingerprints, delete the compressed-encrypted file;

program instructions, stored on at least one of the one or more storage devices to determine that the public key fingerprint matches a second public key fingerprint in metadata of a second compressed-encrypted file in the archive; and program instructions, stored on at least one of the one or more storage devices to, responsive to a determination that the public key fingerprint matches the second public key fingerprint, not delete the second compressed-encrypted file.

16. The computer program product of claim 15, further comprising:

program instructions, stored on at least one of the one or more storage devices to determine that insufficient space exists in a file system hosting the archive, wherein the space is insufficient for extracting all files in the archive; and program instructions, stored on at least one of the one or more storage devices, wherein receiving the command to preprocess the archive from the authenticated user is, responsive to a determination that insufficient space exists in the file system to determine that the at least one public key fingerprint fails to match all public key fingerprints in metadata of a first compressed-encrypted file in the archive.

17. The computer program product of claim 16, further comprising:

program instructions, stored on at least one of the one or more storage devices to, responsive to the determination that the at least one public key fingerprint matches the second public key fingerprint, extract the second compressed-encrypted file to form an uncompressed file.

18. The computer program product of claim 17, further comprising:

program instructions, stored on at least one of the one or more storage devices to, responsive to not deleting the second compressed-encrypted file, determine that sufficient space exists to extract the second compressed-encrypted file; and program instructions, stored on at least one of the one or more storage devices to, responsive to a determination that sufficient space exists to extract the second compressed-encrypted file, extract the second compressed-encrypted file.

19. The computer program product of claim 15, further comprising:

program instructions, stored on at least one of the one or more storage devices, to determine that a third file in the archive is not encrypted; and program instructions, stored on at least one of the one or more storage devices to, responsive to a determination that the third file in the archive is not encrypted, not delete the third file.

20. The computer program product of claim 15, wherein the at least one public key fingerprint comprises an active public key fingerprint and a deprecated public key fingerprint.

* * * * *